US006438727B2

(12) United States Patent
Kim

(10) Patent No.: US 6,438,727 B2
(45) Date of Patent: Aug. 20, 2002

(54) THREEFOLD ERROR CORRECTION CODING METHOD AND APPARATUS FOR HIGH DEFINITION DIGITAL VIDEO CASSETTE RECORDER

(75) Inventor: Byeong-Soo Kim, Kwachun (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/842,085

(22) Filed: Apr. 26, 2001

Related U.S. Application Data

(62) Division of application No. 09/124,051, filed on Jul. 29, 1998, now Pat. No. 6,247,156.

(30) Foreign Application Priority Data

Jul. 29, 1997 (KR) .............................................. 97-35842

(51) Int. Cl.[7] .......................... G11C 29/00; H03M 13/00
(52) U.S. Cl. ....................................... 714/764; 714/755
(58) Field of Search ................................. 714/764, 755, 714/752, 753, 756, 763, 758, 701, 702, 746, 769, 770, 771, 48, 49, 52; 711/127, 157, 5, 104

(56) References Cited

U.S. PATENT DOCUMENTS

| | | | | |
|---|---|---|---|---|
| 4,357,702 A | * | 11/1982 | Chase et al. | 714/700 |
| 5,396,504 A | | 3/1995 | Pack | 714/755 |
| 5,511,096 A | | 4/1996 | Huang et al. | 375/265 |
| 5,841,794 A | | 11/1998 | Inoue et al. | 714/755 |
| 5,878,187 A | | 3/1999 | Kubota et al. | 386/95 |
| 6,154,866 A | * | 11/2000 | Kawahara et al. | 714/755 |
| 6,247,156 B1 | * | 6/2001 | Kim | 714/755 |
| 6,311,304 B1 | * | 10/2001 | Kwon | 714/755 |
| 6,338,155 B1 | * | 1/2002 | Noda | 714/763 |

FOREIGN PATENT DOCUMENTS

| | | | |
|---|---|---|---|
| JP | 2-122479 | 5/1990 | ........... G11B/20/18 |
| JP | 2-306476 | 12/1990 | ........... G11B/20/18 |
| JP | 7-176149 | 7/1995 | ........... G11B/20/18 |
| JP | 9-245442 | 9/1997 | ........... G11B/20/18 |

* cited by examiner

Primary Examiner—Christine T. Tu
(74) Attorney, Agent, or Firm—Sughrue Mion, PLLC

(57) ABSTRACT

A recording/reproducing apparatus is provded for dispersedly recording one-frame data on a plurality of tracks. The recording/reproducing apparatus includes a trans-codec for format converting received digital data into sync blocks each of which has a predetermined size and converting the sync blocks into a format possessed by the received digital data, a frame error corrector for interleaving data of the sync blocks allocated on different tracks in each frame using the sync blocks supplied from the trans-codec and performing frame error correction coding with respect to the interleaved data, and for error correction decoding and deinterleaving the frame error correction coded data, an error correction codec for performing inner code/outer code error correction coding with respect to the frame error correction coded data and performing inner code/outer code error correction decoding with respect to the inner code/outer code error correction coded data, and a recording/reproduction unit for recording the data supplied from the error correction codec on a recording medium and supplying the data recorded on the recording medium to the error correction codec. Accordingly, the present invention performs an additional frame error correction coding in addition to the inner and outer code error correction, to thereby improve a quality of picture during reproduction in a high compression system such as a HD-DVCR and prevent a picture from being broken.

6 Claims, 7 Drawing Sheets

THREEFOLD ERROR CORRECTION CODING METHOD AND APPARATUS FOR HIGH DEFINITION DIGITAL VIDEO CASSETTE RECORDER

This is a divisional of application Ser. No. 09/124,051 (Confirmation No. unknown) filed Jul. 29, 1998, now U.S. Pat. No. 6,247,156 the disclosure of which is incorporated herein by reference.

BACKGROUND OF THE INVENTION

1. Field of the Invention

The present invention relates to an error correction coding method and apparatus, and more particularly, to a threefold error correction coding method and apparatus for reinforcing an error correction capability of a system which uses an inner error correction code and an outer error correction code with respect to data compressed at a high compression rate.

2. Description of the Related Art

A high definition digital video cassette recorder (HD-DVCR) is a system using an inner error correction code and an outer error correction code for channel coding. The HD-DVCR can record or reproduce signals adopting an A-TV (Advanced Television) system of U.S.A. The HD-DVCR is used as a data storage in which data compressed according to the MPEG II standard can be stored and from which the stored data is reproduced. The HD-DVCR uses the same recording format and channel processing portion as those of SD-DVC (standard digital video camcorder). For example, for 525/60 system, the HID-DVCR uses 10 segment recording formats in which one-frame data is recorded on 10 tracks, and uses an inner error correction code and an outer error correction code for error-correcting the compressed data.

However, since the HD-DVCR uses variable length coding according to the MPEG II standard, it provides a higher compression rate than the SD-DVC which provides a compression rate of 1/5 or so. Therefore, when the HD-DVCR and the SD-DVC use the same error correction techniques, the HD-DVCR provides a lower quality of picture than the SD-DVC, in accordance with an error degree in a transmission channel. That is, even though the SD-DVC provides an excellent quality of picture, the HD-DVCR causes severe degradation in the quality of picture and makes picture restoration impossible.

SUMMARY OF THE INVENTION

To solve the above problems, it is an object of the present invention to provide an error correction method for reinforcing an error correction capability, by using an additional error correction code in addition to an inner error correction code and an outer error correction code.

It is another object of the present invention to provide an apparatus embodying the above threefold error correction method.

To accomplish the above object of the present invention, there is provided an error correction method for use in a recording/reproducing apparatus for dispersedly recording one-frame data on a plurality of tracks, the error correction method comprising the steps of: (a) format converting received digital data into sync blocks each of which has a predetermined size; (b) interleaving data of the sync blocks which are allocated on different tracks in each frame using the sync blocks stored in step (a) and performing error correction coding with respect to the interleaved data; and (c) performing inner error correction coding and outer error correction coding with respect to the error correction coded data.

To accomplish the other object of the present invention, there is provided a recording/reproducing apparatus for dispersedly recording one-frame data on a plurality of tracks, the recording/reproducing apparatus comprising: a trans-codec for format converting received digital data into sync blocks each of which has a predetermined size, and converting the sync blocks into a format possessed by the received digital data;

error correction means for interleaving data of the sync blocks allocated on different tracks in each frame using the sync blocks supplied from the trans-codec and performing frame error correction coding with respect to the interleaved data, and for error correction decoding and deinterleaving the frame error correction coded data;

an error correction codec for performing inner code/outer code error correction coding with respect to the frame error correction coded data and performing inner code/outer code error correction decoding with respect to the inner code/outer code error correction coded data; and a recording/reproduction unit for recording the data supplied from the error correction codec on a recording medium and supplying the data recorded on the recording medium to the error correction codec.

DETAILED DESCRIPTION OF THE INVENTION

A preferred embodiment of the present invention will be described with reference to the accompanying drawings.

Figure 1:
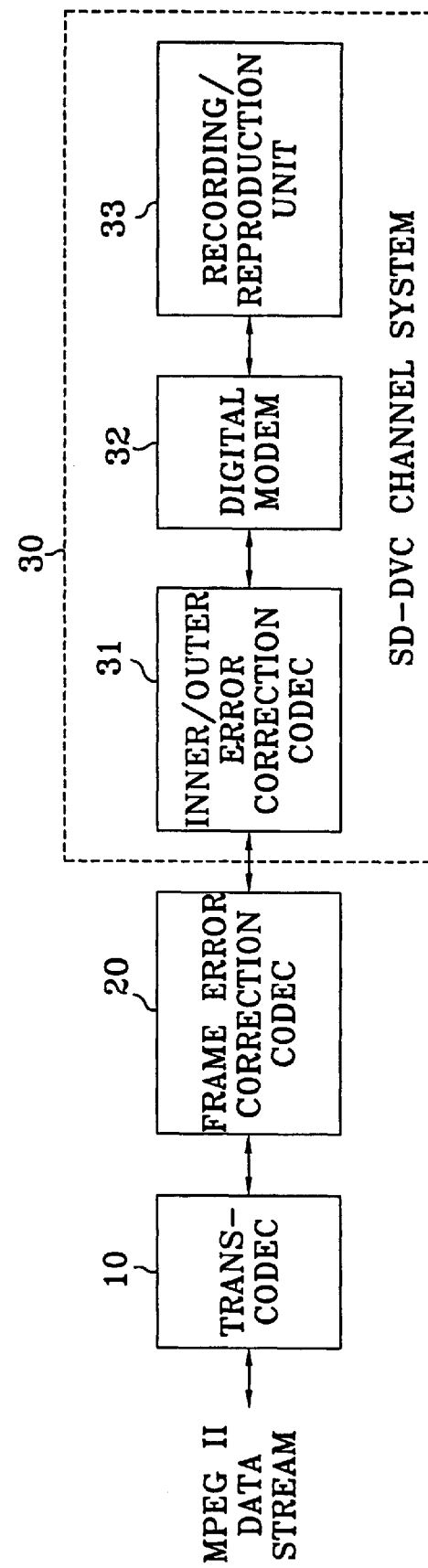
FIG. 1 is a block diagram showing part of a HD-DVCR using frame error correction according to a preferred embodiment of the present invention.

Referring to FIG. 1, a HD-DVCR according to a preferred embodiment of the present invention includes a trans-codec 10, a frame error correction codec 20 and a SD-DVC channel system 30. The SD-DVC channel system 30 includes an inner/outer error correction codec 31, a digital modem 32 and a recording/reproduction unit 33.

When the FIG. 1 apparatus performs a recording operation, the trans-codec 10 receives a stream of data compressed and coded according to the MPEG II standard, that is, a data stream containing programs, and arranges the received data stream as packets each of which has a data amount of 188 bytes. Then, the trans-codec 10 converts two packets into a sync block format. In more detail, the transcodec 10 removes a sync signal of 1 byte. contained in each packet and affixes a time stamp extra header of 3 bytes containing packet information to the leading end of each packet. Subsequently, the trans-codec 10 uses two packets to form 5 sync blocks and affixes a sync block extra header of 1 byte containing sync block information to the leading end of each sync block. Accordingly, the 5 sync blocks have data of total 385 bytes and data of each sync block becomes 77 bytes. The data which is converted into a form of a sync block format by the trans-codec 10 is supplied to the frame error correction codec 20.

The frame error correction codec 20 performs an operation of inserting parities being a frame error correction code into data supplied from the trans-codec 10, in units of a frame. The data into which the parities have been inserted is supplied to the SD-DVC channel system 30. The inner/outer error correction codec 31 in the SD-DVC channel system 30 performs inner code error correction coding and outer code error correction coding with respect to the data supplied from the frame error correction codec 20. That is, the inner/outer error correction codec 31 inserts inner parities being inner error correction codes and outer parities being outer error correction codes into the data received from the frame error correction codec 20. The digital modem 32 performs a digital modulation operation with respect to the data supplied from the inner/outer error correction codec 31. The recording/reproduction unit 33 records the data supplied from the digital modem 32 on a magnetic tape being a recording medium.

When the FIG. 1 apparatus performs a reproducing operation, the components constituting the FIG. 1 apparatus perform a signal processing which is reverse to that of the recording operation.

Figure 2:
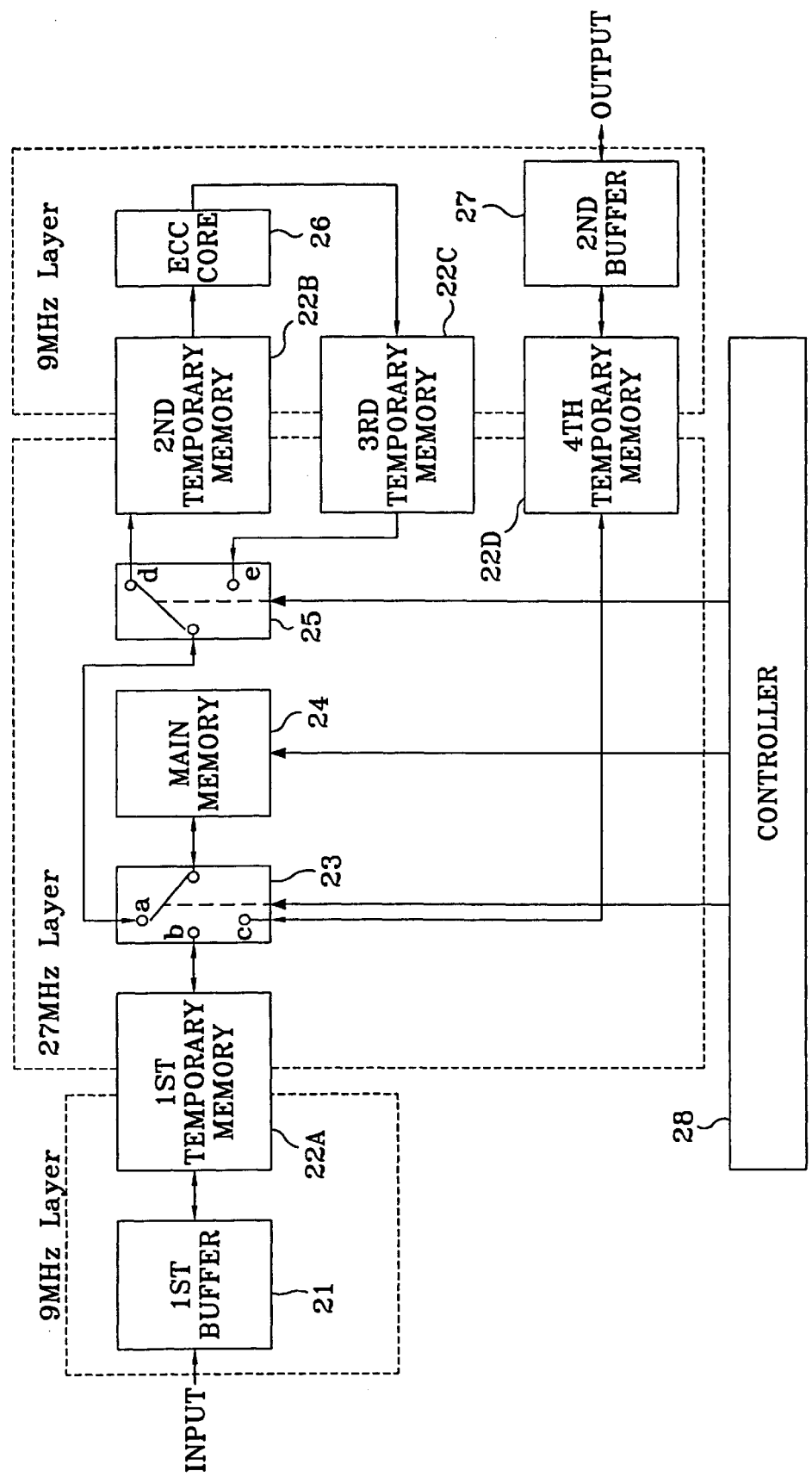
FIG. 2 is a detailed block diagram of a frame error correction codec shown in FIG. 1.

FIG. 2 is a detailed block diagram of a frame error correction codec 20 shown in FIG. 1. The detailed construction and operation of the frame error correction codec 20 shown in FIG. 2 will be described with reference to FIGS. 3 through 7.

Figure 3:
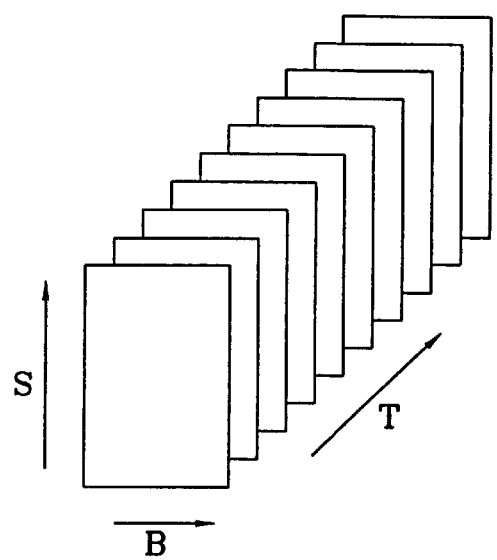
FIG. 3 is a view for explaining one-frame data stored in a main memory shown in FIG. 2.

FIG. 3 shows one-frame data stored in a main memory 24 of the frame error correction codec 2 shown in FIG. 2. In FIG. 3, a character T denotes track numbers of 10 tracks constituting one frame and ranges from 0 to 9. When a track pair number Trp is a value of 0 to 4, the track number of an even-numbered track is Trp*2, and that of an odd-numbered track is Trp*2+1. A character S denotes a sync block number in each track and ranges from 21to 155 and a character B denotes a byte position number in each sync block and ranges from 6 to 81.

Figure 4:
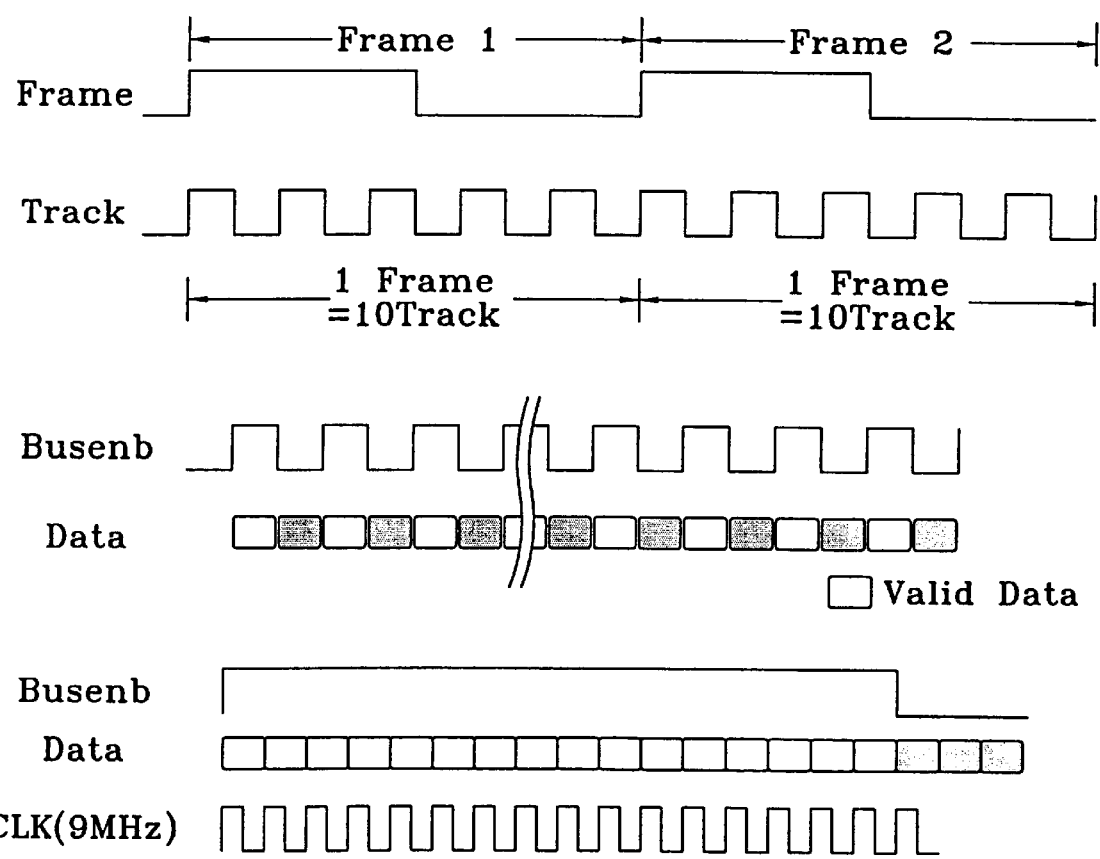
FIG. 4 is a timing diagram for explaining a relationship in a frame, a track, a bus enable signal Busenb, data and clock.

FIG. 4 is a timing diagram for explaining a relationship in a frame, a track, a bus enable signal Busenb, data and clock. In FIG. 4, a period of a frame pulse signal corresponds to each frame and a high level or a low level in a track pulse signal corresponds to a track.

The sync block data output from the trans-codec 10 is supplied to the frame error correction codec 20 in the from of 8-bit data. In FIG. 4, the data supplied from the trans-codec 10 is indicated as valid data. A first buffer 21 shown in FIG. 2 receives the sync block data output from the trans-codec 10, converts the received sync block data into a 16-bit data form and outputs the converted result to a first temporary memory 22A. In particular, the data output from the trans-codec 10 passes through the first buffer 21 and is supplied to the first temporary memory 22A during the time when a bus enable signal Busenb is in a high level. The first temporary memory 22A temporarily stores the data output from the first buffer 21 for timing control and outputs the stored data to a first switch 23. When data is output from the first temporary memory 22A to the first switch 23, the movable contact of the first switch 23 is sequentially and alternately connected to fixed contacts b and c, under the control of a controller 28. During the time when the movable contact is connected to the fixed contact b, data supplied from the first temporary memory 22A is supplied to the main memory 24. Meanwhile, during the time when the movable contact is connected to the fixed contact c, the frame error correction coded data stored in the main memory 24 is supplied to a fourth temporary memory 22D.

In this embodiment, the memories 22A through 22D temporarily store the data output from the switches 23 and 25 and the ECC core 26 for timing control and implemented by SRAMs. The main memory 24 has 3 storage areas each storing data of a frame, and uses the storage area corresponding to each frame to sequentially and circulatively perform a storage operation for data of a corresponding frame received from the first temporary memory 22A, a data input and output operation for frame error correction, and an output operation of outputting the frame error correction coded data to the fourth temporary memory 22D.

The controller 28 uses a clock signal of 9 MHz for data input and output operations with respect to the frame error correction codec 20, and uses clock signals of 9 MHz and 27 MHz for internal data transfer and processing operations. The is because the data input and output with respect to the main memory 24 and the error correction coding of a frame unit should be completed within a predetermined time with respect to each frame. In other words, an interleaving operation, a codeword generation operation and an operation of storing the generated codeword in the main memory 24 should be performed with respect to the entire data within a frame during a given time. In this embodiment, the main memory 24 is implemented as synchronous DRAM which provides a writable/readable burst mode for a short time. However, the main memory 24 can be implemented as fast page (FP) DRAM or Rambus DRAM.

When an interval of time corresponding to one frame lapses, the entire data of one frame is stored in one storage area in the main memory 24. Then, under the control of the controller 28, the main memory 24 selects the stored one frame video data according to a predetermined interleaving scheme. The main memory 24 outputs the selected video data to the first switch 23 as an information word.

During the time when the bus enable signal shown in FIG. 4 is in a low level, the frame error correction codec 20 processes the data supplied from the trans-codec 10 for frame error correction coding. For this purpose, under the control of the controller 28, the movable contact of the first switch 23 is connected to the fixed contact a and the movable contact of the second switch 25 is connected to the fixed contact d or e sequentially and alternately. Therefore, the information word output from the main memory 24 passes through the first and second switches 23 and 25 and the second temporary memory 22B, and then supplied to the ECC core 26. The data output from the ECC core 26 passes through the third temporary memory 22C, and the switches 25 and 23 in turn and stored in the main memory 24.

Figure 5:
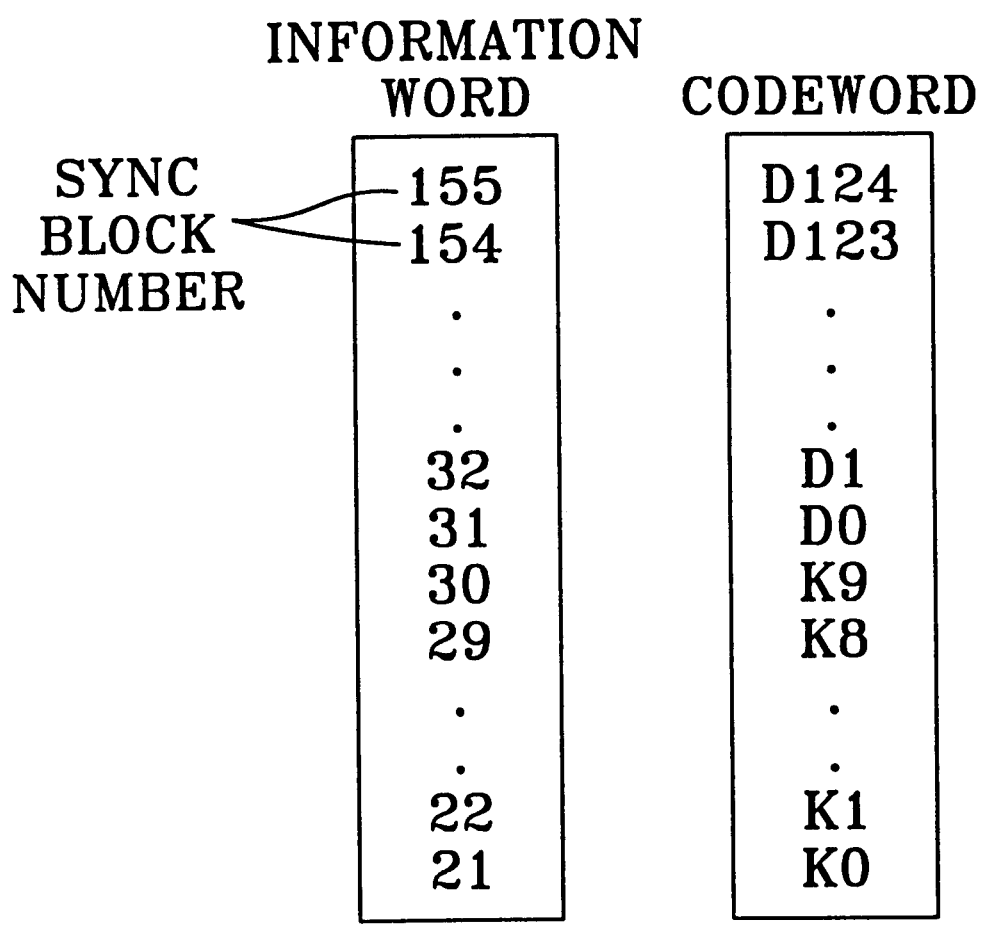
FIG. 5 is a conceptual view for explaining the operation of the ECC core 26 shown in FIG. 2.
Figure 6:
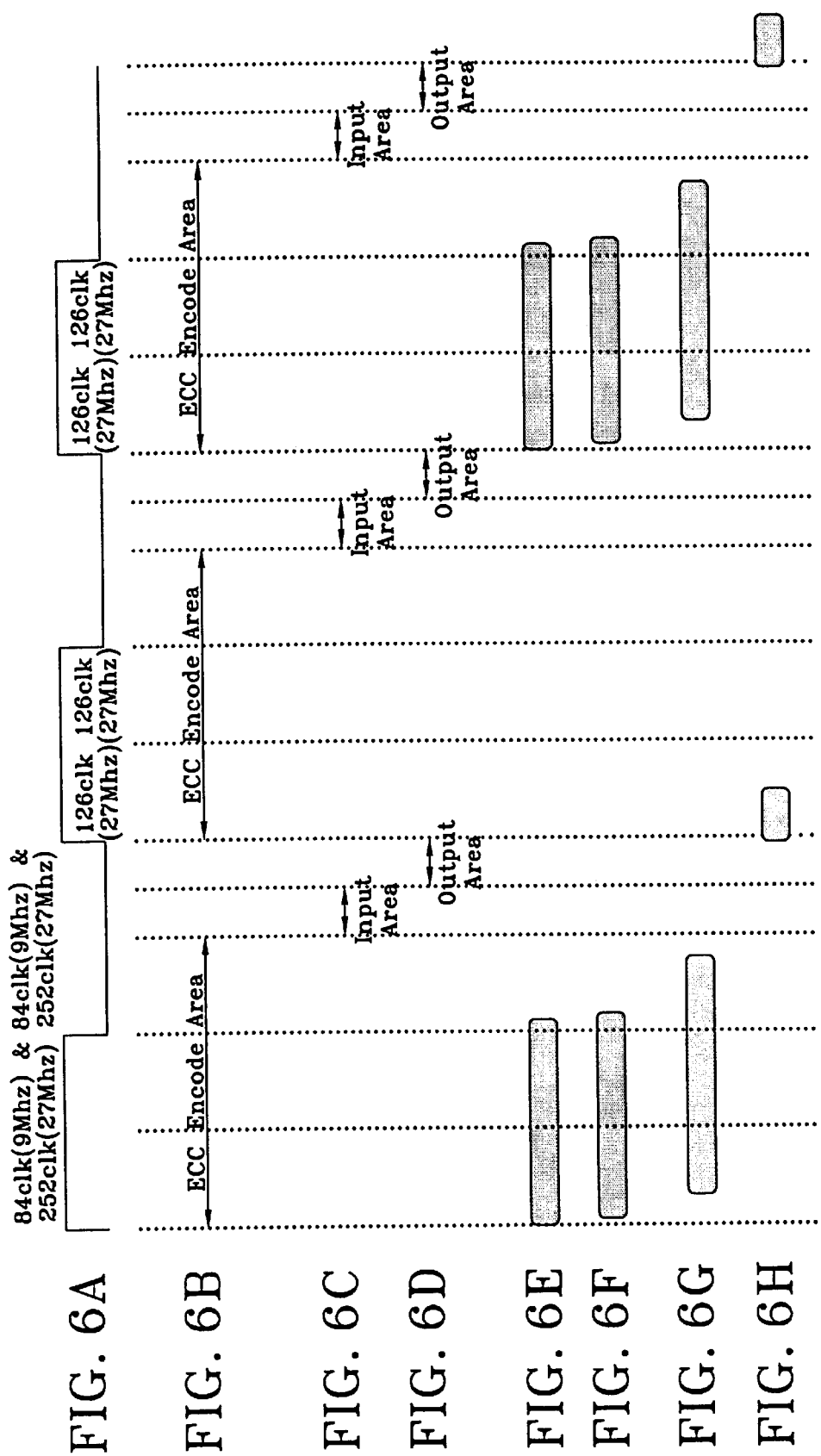
FIGS. 6A through 6H are timing diagrams for explaining the operation of the frame error correction codec 20 shown in FIG. 2.

FIG. 5 is a conceptual view for explaining the operation of the ECC core 26 shown in FIG. 2. The ECC core 26 uses a Reed-Solomon codes (R-S codes) which are widely used as error correction codes and performs frame error correction coding with respect to information words supplied from the second temporary memory 22B. In this embodiment, the ECC core 26 uses [a](135, 125) R-S codes in which a generator polynomial is given as $g(X)=X^8+X^4+X^3+X^2+1$ for error correction coding codes with respect to each frame. If a data polynomial is given as $D(X)=D_{124}X^{124}+D_{123}X^{123}+D_{122}X^{122}+ \ldots +D_1X+D_0$, the remainder obtained by dividing the $X^{10}D(X)$ by $g(X)$ is represented as the following equation (1).

$$P(X)=K_9X^9+K_8X^8+K_7X^7+K_6X^6+K_5X^5+K_4X^4+K_3X^3+K_2X^2+K_1X+K_0 \quad (1)$$

The coefficients $K_9$, $K_8$, $K_7$, $K_6$, $K_5$, $K_4$, $K_3$, $K_2$, $K_1$ and $K_0$ indicated in [the] equation (1) are parities for frame error correction. Thus, a codeword polynomial is expressed as $CW=D_{124}X^{124}+D_{123}X^{123}+D_{122}X^{122}+ \ldots +D_1X+D_0+K_9X^9+K_8X^8+K_7X^7+K_6X^6+K_5X^5+K_4X^4+K_3X^3+K_2X^2+K_1X+K_0$. The relationship between each sync block number and a codeword is shown in FIG. 5 and defined as the following equation (2).

$$CW = \sum_{i=0}^{134} R(i)X^i \begin{cases} R(i) = K(i), & i = 0 \ldots 9 \\ R(i) = D(i-10), & i = 10 \ldots 134 \end{cases} \quad (2)$$

In FIG. 5, the sync block number corresponds to sync blocks for video data and ranges from 21 to 155. The D0 through D124 are information words of video data selected from the sync blocks, and K0 through K9 are parities which are corresponding to D0 through D124. The information words and the corresponding parities constitutes a codeword. The codeword is obtained by using a R-S codes with respect to the data of the sync blocks.

FIGS. 6A through 6H are timing diagrams for explaining the operation of the frame error correction codec 20 shown in FIG. 2. Referring to FIG. 6A, the controller 28 generates 84 clock pulses when a bus enable signal Busenb of 9 MHz is used and generates 252 clock pulses when a bus enable signal Busenb of 27 MHz is used. As shown in FIG. 6B, under the control of the controller 28, an interval of time from a high level start point of time of the bus enable signal Busenb to 126 clock pulses in a low level section is allocated for frame error correction coding with respect to the data of sync blocks contained in the (N−1)th frame in the main memory 24. Among the remaining 126 clock pulses in the low level section of the bus enable signal Busenb, the 63 time-led clock pulses are allocated with an interval of time for storing the data of the sync blocks of the Nth frame output from the first temporary memory 22A in the main memory 24 (FIG. 6C), and the remaining 63 clock pulses are allocated with an interval of time for outputting the error correction coded data of the (N−2)th frame stored in the main memory 24 to the fourth temporary memory 22D (FIG. 6D). During the interval of time for the frame error correction coding of one frame, the main memory 24 reads the video data of the stored (N−1)th frame as an information word of 125 bytes according to a predetermined interleaving scheme. The information word is stored in the second temporary memory 22B via the switches 23 and 25 (FIG. 6E). The information word stored in the second temporary memory 22B is time-delayed slightly and then applied to the ECC core 26 (FIG. 6F). The ECC core 26 performs the frame error correction coding operation as described with reference to FIG. 5. The thus-obtained codeword of 135 bytes is stored in the third temporary memory 22C (FIG. 6G). During the next interval of time for frame error correction coding, the third temporary memory 22C supplies the codeword generated by the ECC core 26 to the second switch 25. The codeword is stored in the main memory 24 sequentially via the switches 25 and 23 (FIG. 6H). The above-described procedure is repeatedly performed for frame error correction coding with respect to the data of the entire 10 tracks. As a result, one frame, that is, the video data of the total 10 tracks are stored in the main memory 24 in the form of codewords in which parities are dispersed in 10 tracks.

When the frame error correction coding with respect to one frame is completed, 760 codewords exist with respect to the entire video data of one frame. Assuming that n denotes a codeword number for 0 to 759, i denotes an index with respect to a byte of each codeword, and 76 is the number of the codewords per track, the relationship among B, S and T before being frame error correction coded and the index i for the byte in the frame error correction coded block is expressed as the following equation (3), according to the predetermined interleaving scheme.

$B=(n-i) \bmod(76)+6$ $S=i+21$ $T=(n*\text{div}(76)+i*7) \bmod(10)$ \quad (3)

Here, div(·) is a division operator and mod(·) is a modular operator.

According to the relationship shown in the equation (3), the codeword number is sequentially increased over the 10 tracks, and the sync block number and the byte position are sequentially increased as well, according to the predetermined interleaving scheme. However, the above sequential increase does not limit the present invention. Therefore, if the codeword number, the sync block number and the byte position are allocated over one frame, they can be altered in different forms. For instance, the sync block number and the byte position can be sequentially decreased or changed in different forms.

Figure 7:
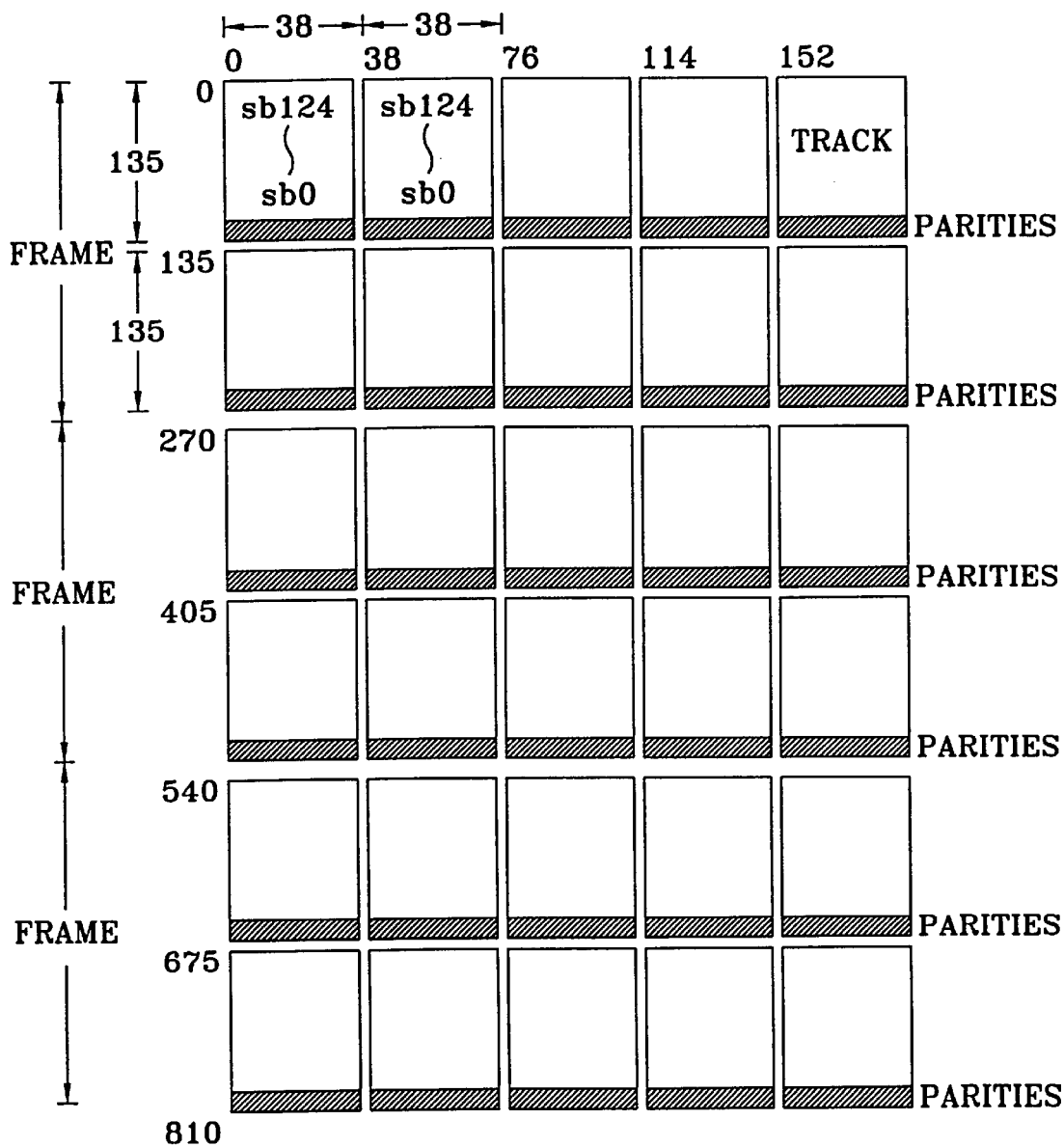
FIG. 7 shows a memory map with respect to a main memory after frame error correction coding has been performed.

FIG. 7 shows a memory map with respect to the main memory 24 after frame error correction coding has been performed. Referring to FIG. 7, the main memory 24 has a data storage capacity of 3 frames, in which each frame is composed of 10 tracks. Each track is composed of a parity of 10 bytes, an information word of 125 bytes (sb0 through sb124) and 38 codewords. The reason why the number of the codewords corresponding to each track is 38 is because the first buffer 21 converts the data received from the transcodec 10 into a 16-bit data form and outputs the result. Therefore, when the first buffer 21 does not alter the number of bits of the received data and supplies it to the first temporary memory 22A, the number of the codewords corresponding to each track becomes 76.

The codewords generated by the ECC core 26 are stored in the third temporary memory 22C. The parities for frame error correction among the codewords stored in the temporary memory 22C are stored in the main memory 24 via the witches 23 and 25. Under the control of the controller 28, the movable contact of the first switch 23 is connected to the fixed contact c and the frame error correction coded data read from the main memory 24 is stored in the fourth temporary memory 22D. The data stored in the fourth temporary memory 22D is input to the second buffer 27. The second buffer 27 bit-converts the input data into a form appropriate to be transferred to the SD-DVC channel system 30. Here, the memories 22B through 22D, the ECC core 26 and the second buffer 27 operate in the clock of 9 MHz. The second buffer 27 outputs the received data to the SD-DVC channel system 30.

The inner/outer error correction codec 31 in the SD-DVC channel system 30 preforms error correction coding for inserting an inner error correction code and an outer error correction code into the data which has been error correction coded in units of a frame, and then is digital-modulated so as to be recorded on a recording medium such as tape. As a result, a format shown in FIG. 8 is recorded on tape.

Figure 8:
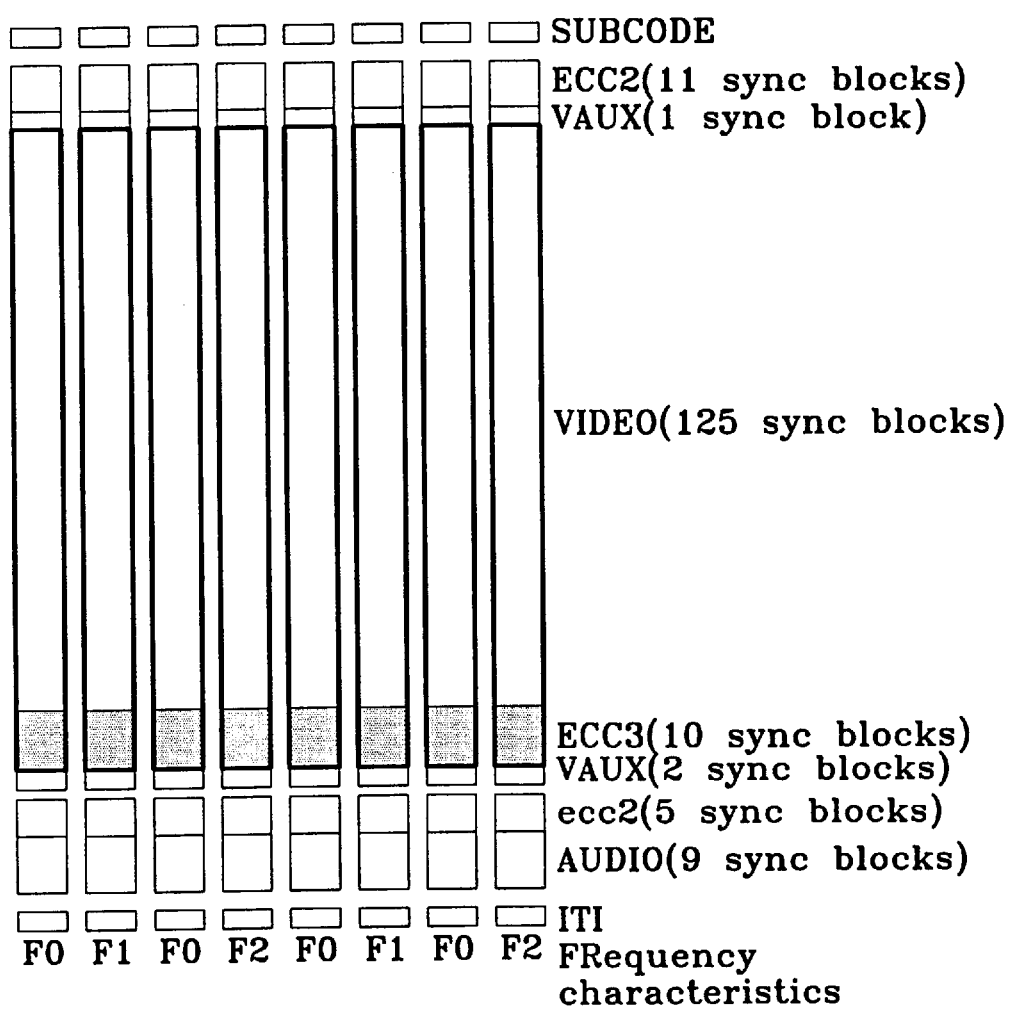
FIG. 8 shows a track format in a HD-DVCR according to the present invention.

FIG. 8 shows a track format in a HD-DVCR according to the present invention. Referring to FIG. 8, each track includes an insert and track information (ITI) area, an audio area, a video area and a sub-code area. The audio area includes audio data composed of 9 sync blocks and an outer code error correction code area ECC2 composed of 5 sync blocks for the audio data. The video area includes video auxiliary data VAUX composed of 2 sync blocks, a frame error correction code according to the present invention, video data composed of 125 sync blocks, VAUX data composed of one sync block and an outer code error correction code ECC2 for video data. The above-described track format is the same as a track format of tape defined in a general SD-DVC, except for the added frame error correction code ECC3.

At the time of reproduction of the above-described HD-DVCR, an error correction decoding operation of data is performed via an inverse process of the recording operation. Particularly, the frame error correction codec 20 uses parities contained in the data stored in the main memory 24 to thereby form an information word. The main memory 24 uses an interleaving scheme described with reference to the above equation (3), to thereby re-align the data in the form before being frame error correction coded. The trans-codec 10 format-converts the frame error correction decoded sync block data in units of a packet and outputs the result.

In the above-described embodiment, the temporary memories 22A through 22D have been used for timing control of data. However, when the data input to or output from the frame error correction codec 20 has a high data rate which can be processed during the interval of time for one frame, the above temporary memories 22A through 22D are not used.

As described above, the threefold error correction method and apparatus according to the present invention performs an additional frame error correction coding in addition to the inner and outer code error correction, and thus improves a quality of picture during reproduction in a high compression system such as a HD-DVCR and prevents a picture from being broken.

What is claimed is:

1. A recording/reproducing apparatus for dispersedly recording one-frame data on a plurality of tracks, the recording/reproducing apparatus comprising:

a trans-codec for format converting received digital data into sync blocks each of which has a predetermined size and converting the sync blocks into a format possessed by the received digital data;

error correction means for interleaving data of the sync blocks allocated on different tracks in each frame using the sync blocks supplied from the trans-codec and performing frame error correction coding with respect to the interleaved data, and for error correction decoding and deinterleaving the frame error correction coded data;

an error correction codec for performing inner code/outer code error correction coding with respect to the frame error correction coded data and performing inner code/outer code error correction decoding with respect to the inner code/outer code error correction coded data; and a recording/reproduction unit for recording the data supplied from the error correction codec on a recording medium and supplying the data recorded on the recording medium to the error correction codec.

2. The recording/reproducing apparatus according to claim 1, wherein said error correction means comprises:

a memory having storage areas for storing a plurality of frames, for sequentially and circulatively performing a storage operation of the data supplied from the trans-codec, an operation of providing the stored data for frame error correction coding, and an operation of supplying the frame error correction coded data to the trans-codec, using a storage area of a one-frame size; and an error correction coder (ECC) core for performing one of the frame error correction coding and decoding, in response to the data provided from the memory.

3. The recording/reproducing apparatus according to claim 2, wherein said error correction means further comprises data transfer means for transferring the data supplied from the trans-codec to the memory, so that the memory can perform the operations sequentially and circulatively.

4. The recording/reproducing apparatus according to claim 2, wherein said memory is constituted by a synchronous DRAM.

5. The recording/reproducing apparatus according to claim 1, wherein said error correction means further comprises data conversion means for converting the frame error correction coded data stored in the memory into the form which can be processed in the error correction codec, and supplying the converted data to the error correction codec.

6. The recording/reproducing apparatus according to claim 1, wherein said recording/reproducing apparatus is a HD-DVCR.

* * * * *